US012491570B2

(12) United States Patent
Huhtanen et al.

(10) Patent No.: US 12,491,570 B2
(45) Date of Patent: Dec. 9, 2025

(54) SCROLL SHEAR TOOL

(71) Applicant: MILWAUKEE ELECTRIC TOOL CORPORATION, Brookfield, WI (US)

(72) Inventors: Simo A. Huhtanen, Columbus, OH (US); Julia C. Marsh, Milwaukee, WI (US); Terry L. Timmons, Jr., Oconomowoc, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 117 days.

(21) Appl. No.: 18/340,354

(22) Filed: Jun. 23, 2023

(65) Prior Publication Data

US 2023/0415249 A1 Dec. 28, 2023

Related U.S. Application Data

(60) Provisional application No. 63/355,501, filed on Jun. 24, 2022.

(51) Int. Cl.
*B23D 29/00* (2006.01)
*B23D 36/00* (2006.01)

(52) U.S. Cl.
CPC ....... *B23D 29/005* (2013.01); *B23D 36/0008* (2013.01)

(58) Field of Classification Search
CPC .. B23D 29/005; B23D 36/0008; B23D 15/12; B23D 35/002; B23D 35/005; B23D 15/04; B27M 1/003; B27G 17/04; Y10T 83/02; Y10T 83/8776; Y10T 83/8778; Y10T 83/8854; Y10T 83/8866; Y10T 83/8853; Y10T 83/8867; Y10T 83/8848

USPC .... 30/228; 83/861, 586, 582, 636, 694, 641, 83/584, 585, 628, 635, 639, 640, 633, 83/634
See application file for complete search history.

(56) References Cited

U.S. PATENT DOCUMENTS

| 1,922,846 | A |   | 8/1933 | Gray |                |
|-----------|---|---|--------|------|----------------|
| 2,256,779 | A |   | 9/1941 | McHenry |             |
| 2,339,641 | A | * | 1/1944 | Jensen | ........... B23D 35/005 |
|           |   |   |        |      | 83/699.41      |
| 2,778,421 | A | * | 1/1957 | Munschauer | ....... B23D 35/005 |
|           |   |   |        |      | 83/640         |

(Continued)

FOREIGN PATENT DOCUMENTS

DE            8615167 U1    7/1986

*Primary Examiner* — Ghassem Alie
(74) *Attorney, Agent, or Firm* — Michael Best & Friedrich LLP

(57) ABSTRACT

A blade clearance adjustment mechanism for a scroll shear tool is configured to adjust a horizontal blade clearance between a fixed blade and a moving blade. The blade clearance adjustment mechanism includes an adjustment bushing supported within a bushing pathway. The adjustment bushing supports a reciprocatory spindle, and a relative position of the adjustment bushing within the bushing pathway affects a relative position of the moving blade with respect to the fixed blade. The blade clearance adjustment mechanism further includes an adjustment member coupled to the adjustment bushing. The adjustment member is configured to change the relative position of the adjustment bushing between a first position associated with a first blade clearance and a second position associated with a second blade clearance.

11 Claims, 17 Drawing Sheets

(56) References Cited

U.S. PATENT DOCUMENTS

| | | | |
|---|---|---|---|
| 3,032,876 A | | 5/1962 | Klemmer |
| 3,199,395 A | * | 8/1965 | Savory .................. B23D 33/08 83/628 |
| 3,270,606 A | * | 9/1966 | Schott, Jr. ............ B23D 35/005 83/579 |
| 3,765,293 A | * | 10/1973 | Fries ...................... B23D 33/00 83/543 |
| 3,828,432 A | | 8/1974 | Leibinger |
| 3,968,714 A | * | 7/1976 | Kuchyt ................ B23D 35/005 83/639.7 |
| 4,416,176 A | * | 11/1983 | Forthmann ............ B26D 1/085 83/628 |
| 4,936,177 A | * | 6/1990 | Ozawa ................. B26D 7/2628 83/636 |
| 5,237,901 A | * | 8/1993 | Warga, III ........... B23D 35/002 83/636 |
| 9,192,390 B2 | | 11/2015 | delRio et al. |
| 9,723,794 B2 | | 8/2017 | Soltesz |
| 2008/0201961 A1 | | 8/2008 | Wu et al. |
| 2009/0165626 A1 | * | 7/2009 | Sundquist ............ B23D 35/005 83/699.41 |

* cited by examiner

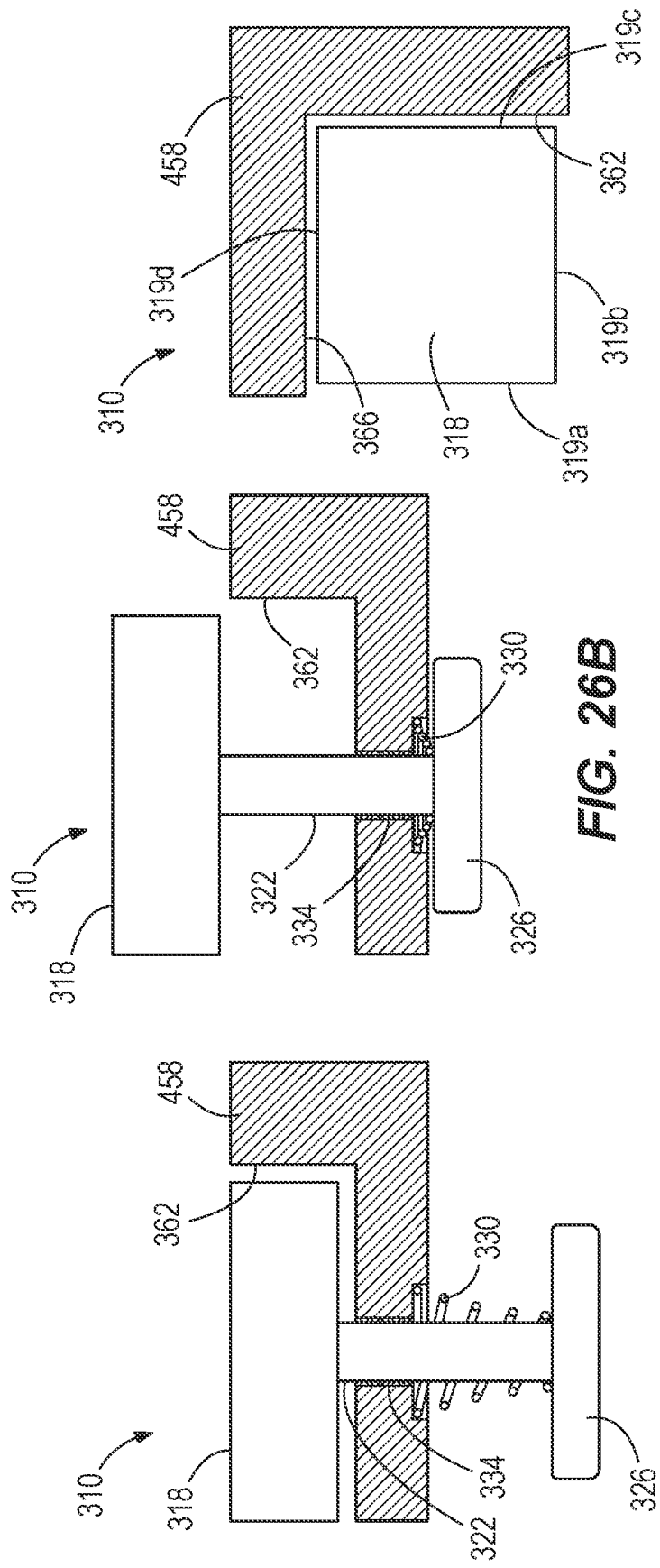

SCROLL SHEAR TOOL

CROSS REFERENCE TO RELATED APPLICATIONS

This application claims priority to U.S. Provisional Patent Application No. 63/355,501, filed on Jun. 24, 2022, the entire content of which is incorporated herein by reference.

FIELD OF THE INVENTION

The present invention relates to power tools, and more particularly to scroll shear tools.

BACKGROUND OF THE INVENTION

Scroll shear tools typically include at least two adjacent knives or shear blades, one being stationary relative to a workpiece and the other being reciprocated relative to the stationary blade and workpiece for performing discrete, consecutive shearing operations to the workpiece to create a contiguous cut in the workpiece.

SUMMARY OF THE INVENTION

The present invention provides, in one aspect, a scroll shear tool comprising a tool body housing a motor. The motor is configured to transmit rotational power through a transmission to a reciprocatory spindle. The reciprocatory spindle includes a first end that is supported by a drive member such as a rotating drive member that may be, for example, an eccentric spindle carrier and a second end distal from the drive member. A blade support arm at least partially surrounds the reciprocatory spindle, and a fixed blade is coupled to the blade support arm. A moving blade is coupled to the second end of the reciprocatory spindle. A blade clearance adjustment mechanism is configured to adjust a horizontal blade clearance between the fixed blade and the moving blade. The blade clearance adjustment mechanism includes an adjustment bushing supported within a bushing pathway. The adjustment bushing supports the reciprocatory spindle, and a relative position of the adjustment bushing within the bushing pathway affects a relative position of the moving blade with respect to the fixed blade. An adjustment member is coupled to the adjustment bushing. The adjustment member is configured to change the relative position of the adjustment bushing between a first position associated with a first blade clearance and a second position associated with a second blade clearance. For example, a screw may be coupled to the adjustment bushing, and the screw may be configured to be accessible by a user and may be rotated in a first direction and a second direction. The screw may be configured such that rotating the screw in the first direction decreases the blade clearance and rotating the screw in the second direction increases the blade clearance.

The present invention provides, in another aspect, a scroll shear tool comprising a tool body housing a motor. The motor is configured to transmit rotational power through a transmission to a reciprocatory spindle. The reciprocatory spindle includes a first end that is supported by a drive member such as a rotating drive member that may be, for example, an eccentric spindle carrier and a second end distal from drive member. A blade support arm at least partially surrounds the reciprocatory spindle. A first fixed blade is coupled to the blade support arm, and a second moving blade is coupled to the second end of the reciprocatory spindle. A blade removal and rotation mechanism is coupled to one of the first fixed blade and the second moving blade. The blade includes a front side and a rear side and at least one groove disposed in the rear side of the blade. The blade removal and rotation mechanism includes a support member having a track so dimensioned to fit within the at least one groove. The track has a first piece and a second piece, and the support member includes a locking member groove extending between the first piece and the second piece. The support member includes a cam space with a top cam and a bottom cam disposed therein. The bottom cam is coupled to an actuator, and the top cam is coupled to a locking member. The locking member is configured to slide within the locking member groove. The locking member is positionable in a locked state and in an unlocked state, and the actuator is configured such that moving the actuator moves the locking member from the locked state to the unlocked state. The blade is configured to receive the locking member when the locking member is positioned in the locked state, and when the blade receives the locking member, the blade is not removable from the support member.

The present invention provides, in another aspect, a scroll shear tool comprising a tool body housing a motor. The motor is configured to transmit rotational power through a transmission to a reciprocatory spindle. The reciprocatory spindle includes a first end that is supported by a drive member that may be a rotating drive member such as, for example, an eccentric spindle carrier and a second end distal from the drive member. A blade support arm at least partially surrounds the reciprocatory spindle. A first fixed blade is coupled to the blade support arm, and a second moving blade is coupled to the second end of the reciprocatory spindle. A blade removal and rotation mechanism is coupled to one of the first fixed blade and the second moving blade. A support pin passes through a support component and includes a first end coupled to the blade and a second end having an actuator. The actuator is biased away from the support component by a biasing member. The support pin is positionable in an engaged position and in a disengaged position depending on a position of the actuator. The blade is rotatable and removable when the support pin is positioned in the disengaged position, and the scroll shear tool is operable when the support pin is positioned in the engaged position.

Other features and aspects of the invention will become apparent by consideration of the following detailed description and accompanying drawings.

BRIEF DESCRIPTION OF THE DRAWINGS

FIG. 26A is a side view of another embodiment of a blade removal and rotation mechanism that may be used with the scroll shear tool of FIG. 1 in an operating state.

FIG. 26B is a side view of the blade removal and rotation mechanism of FIG. 26A in an adjustment state.

FIG. 26C is a top view of the blade removal and rotation mechanism of FIG. 26A.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
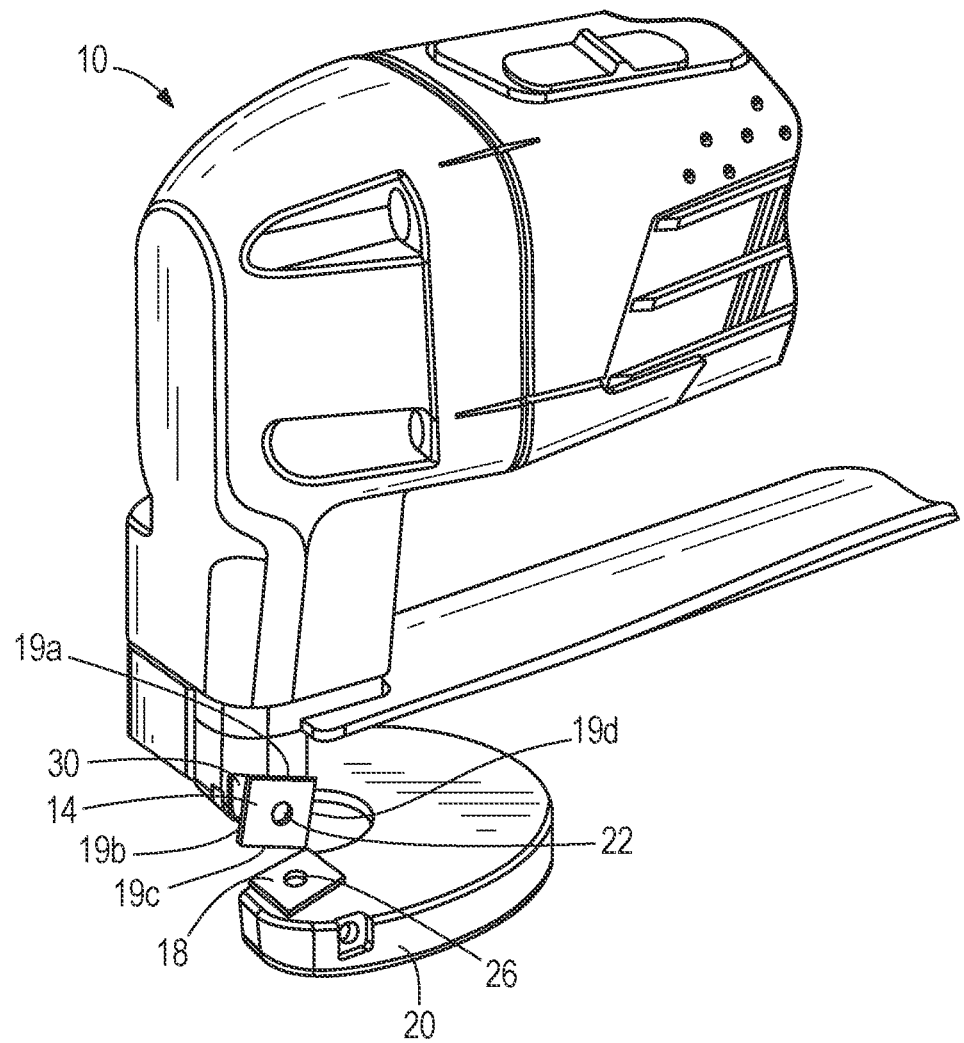
FIG. 1 is a perspective view of a scroll shear tool.

With reference to FIG. 1, a power tool, such as a scroll shear tool 10, may be used to cut a workpiece (e.g., sheet metal). The scroll shear tool 10 includes a first moving blade 14 and a second stationary (i.e., fixed) blade 18 that are perpendicular to each other. The scroll shear tool 10 also includes a support arm 20 to which the stationary blade 18 is affixed. The moving blade 14 may be square-shaped and sharp on all four sides, which respectively include four cutting edges 19a, 19b, 19c, 19d. The stationary blade 18 may also be square-shaped and sharp on all four sides in a similar manner. In the illustrated embodiment, the stationary blade 18 is identical to the moving blade 14. Although the four cutting edges of the stationary blade 18 are not individually numbered, they operate similarly to the four cutting edges 19a, 19b, 19c, 19d of the moving blade 14. The cutting edge of each of the blades 14, 18 that is facing the other of the blades 14, 18 is the cutting edge that is currently positioned in a cutting configuration. Therefore, in the configuration shown in FIG. 1, the cutting edge 19c of the moving blade 14 is in the cutting configuration. The moving blade 14 may be configured such that when the cutting edge 19a, 19b, 19c, 19d that is in the cutting configuration becomes dull, the moving blade 14 may be rotated to a new sharp cutting edge 19a, 19b, 19c, 19d, and such rotation may be 90 degrees or in increments of 90 degrees (e.g., 180 degrees or 270 degrees). When the cutting edge of the stationary blade 18 that is in the cutting configuration becomes dull, the stationary blade 18 may be rotated and adjusted in a similar manner as the moving blade 18.

Figure 2:
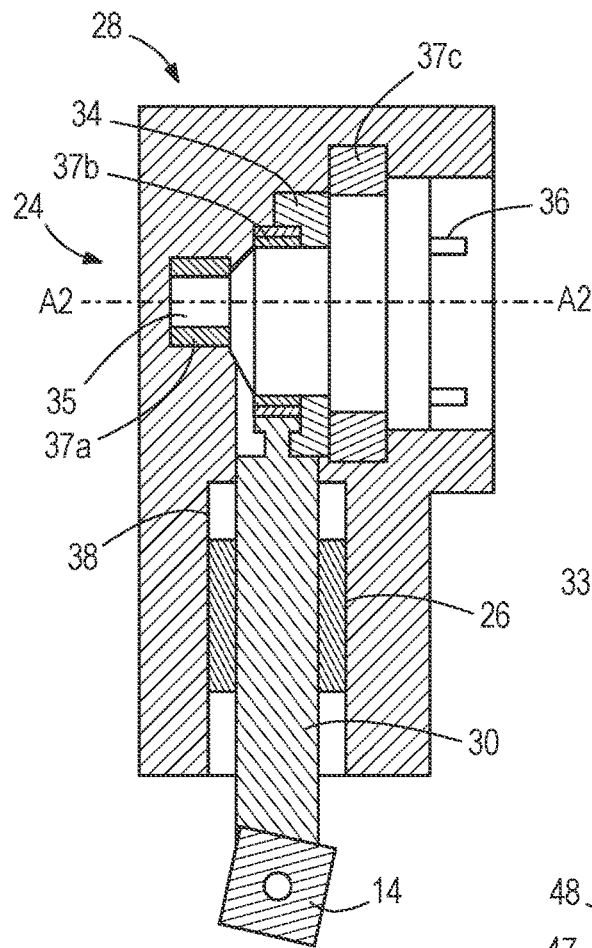
FIG. 2 is a side cross-sectional view of an embodiment of a blade clearance adjustment mechanism that may be used with the scroll shear tool of FIG. 1.
Figure 3:
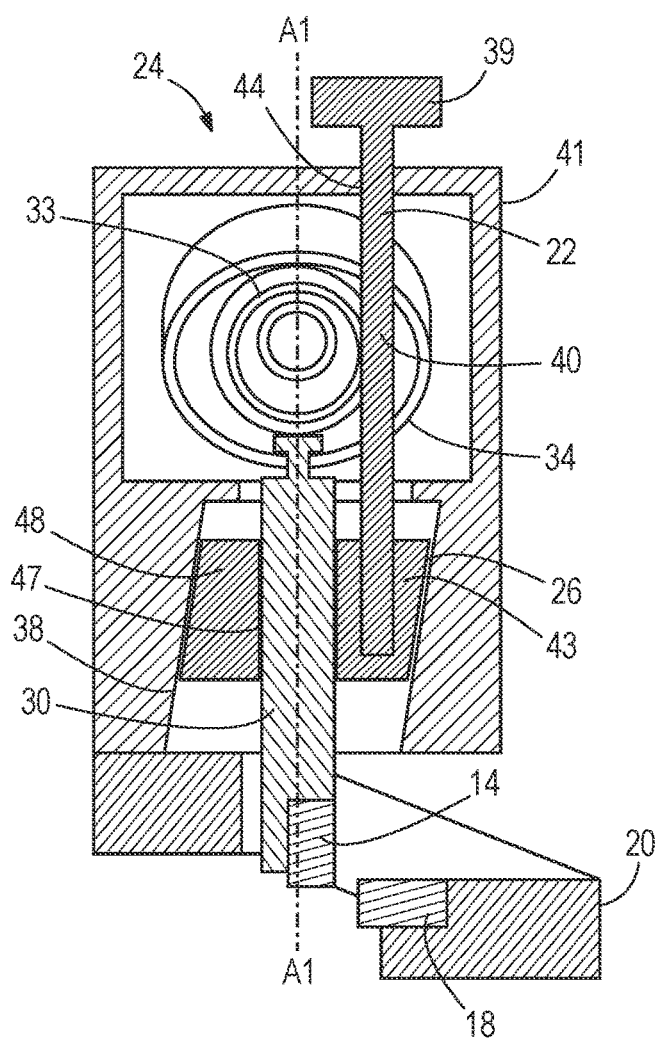
FIG. 3 is a front cross-sectional view of the blade clearance adjustment mechanism of FIG. 2.

With reference to FIGS. 2 and 3, a motor (not shown) is configured to transmit torque through a transmission 28, ultimately resulting in the reciprocating motion of the moving blade 14. The transmission 28 receives torque from the motor or from a geartrain at an interface location 36, through which the torque is transmitted to an eccentric output shaft 35. The output shaft 35 is supported by bushings or bearings 37a, 37b, 37c. A bushing 33 surrounds and supports the output shaft 35 as well as the bearing 37b. A drive member 34 which may be, in some embodiments, a rotating drive member 34 such as an eccentric spindle carrier 34, is mounted on an end of the output shaft 35. In some embodiments, the drive member 34 may be a cam or other drive means. A vertical shaft or reciprocating spindle 30 is carried by the drive member 34 (in the illustrated embodiment, by the eccentric spindle carrier 34). The reciprocating spindle 30 is configured to move along a longitudinal axis A1 of the reciprocating spindle 30 as the eccentric spindle carrier 34 is driven by the output shaft 35. More specifically, as the output shaft 35 rotates, the eccentricity of the output shaft 35 raises and lowers the eccentric spindle carrier 34 in the direction of the longitudinal axis A1 to impart reciprocating motion to the eccentric spindle carrier 34. The moving blade 14 is affixed to the reciprocating spindle 30 and is configured to be moved perpendicularly to a workpiece (e.g., sheet metal) by means of the reciprocatory motion of the reciprocating spindle 30.

With reference to FIGS. 1-3, the reciprocating spindle 30 is at least partially surrounded by the stationary blade support arm 20. The stationary blade 18 is fixed with respect to the stationary blade support arm 20, and a blade clearance C (best shown in FIG. 4C) is defined between the moving blade 14 and the stationary blade 18 in a blade clearance plane. The blade clearance plane is parallel to an orientation of the stationary blade 18. Further, the blade clearance plane is perpendicular to an orientation of the moving blade 14. The blade clearance plane is also perpendicular to the longitudinal axis A1 of the reciprocating spindle 30. The blade clearance plane may be parallel to a rotating axis A2 of the output shaft 35 of the motor. The blade clearance plane may, at certain times, include a line that draws a shortest distance between a point on the moving blade 14 and a point on the stationary blade 18. The blade clearance C is determined by the relative positions of the moving blade 14 and the stationary blade 18. Different blade clearances C may be used for different workpiece thicknesses. For example, a desired, selected, or predetermined blade clearance C may be 0.2 times a workpiece thickness or may be 25% more or less than 0.2 times the workpiece thickness. More specifically, a desired blade clearance C of 0.2 mm may be used for cutting sheet metal with a thickness of 1.0 mm. A desired blade clearance C of 0.4 mm may be used for cutting sheet metal with a thickness of 2.0 mm. A desired blade clearance C of 0.6 mm may be used for cutting sheet metal with a thickness of 3.0 mm. A desired blade clearance C of 0.8 mm may be used for cutting sheet metal with a thickness of 4.0 mm. A desired blade clearance of 0.9 mm may be used for cutting sheet metal with a thickness of 4.5 mm. An operator may adjust the blade clearance C by means of a blade clearance adjustment mechanism.

Figure 4:
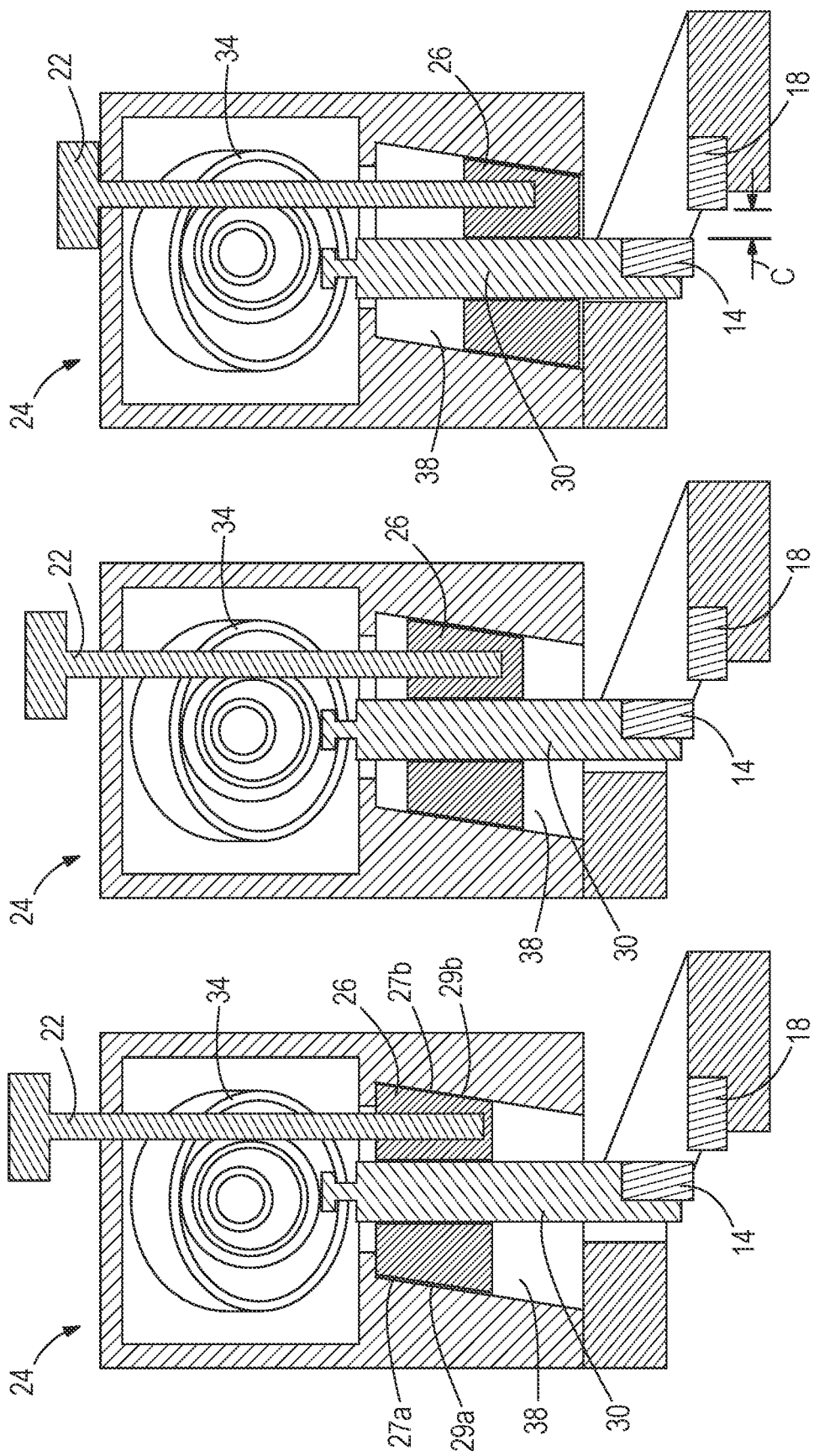
FIGS. 4A-4C are front cross-sectional views of the blade clearance adjustment mechanism of FIG. 2 showing various blade clearances.
Figure 5:
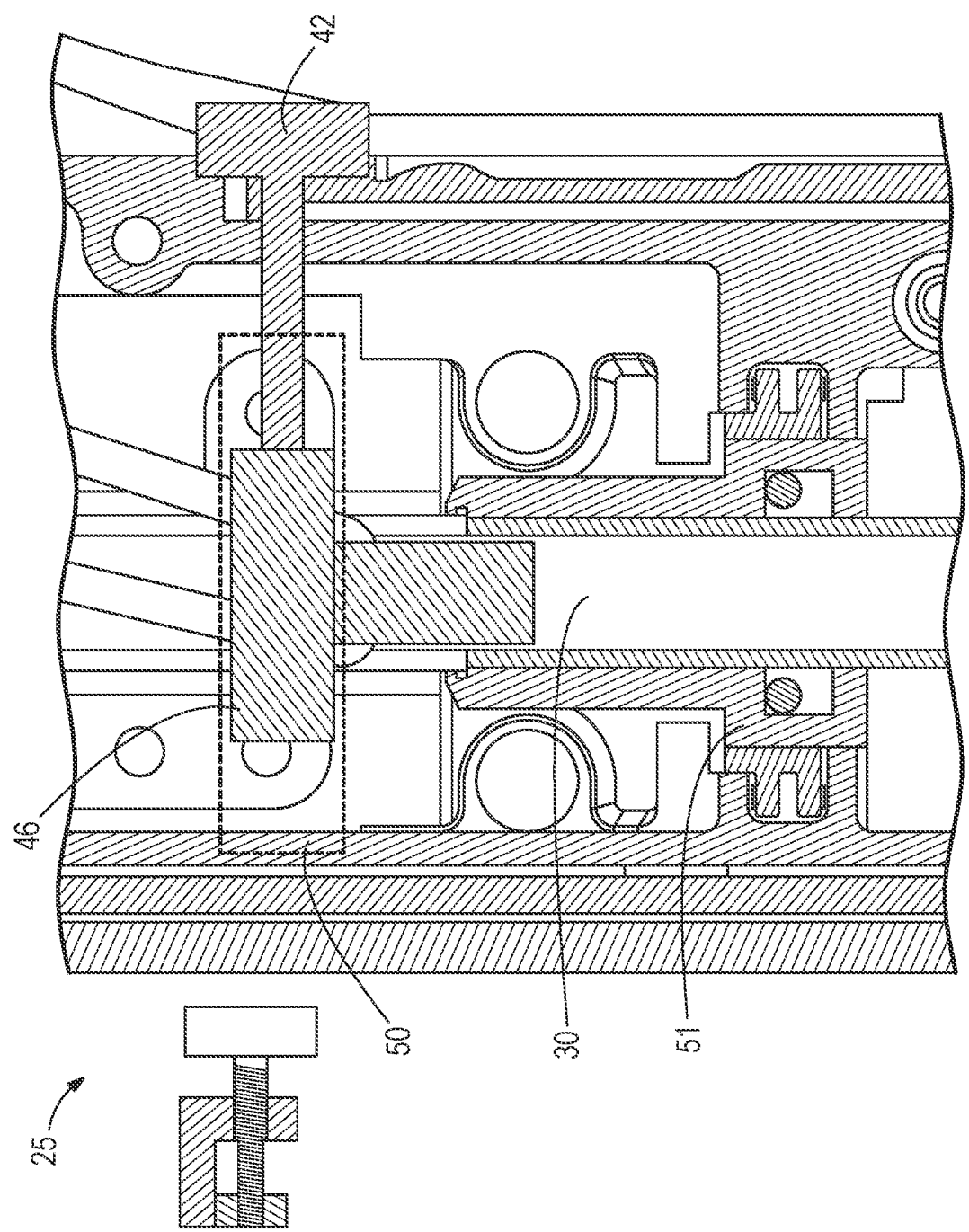
FIG. 5 is a front cross-sectional view of another embodiment of a blade clearance adjustment mechanism that may be used with the scroll shear tool of FIG. 1.
Figure 6:
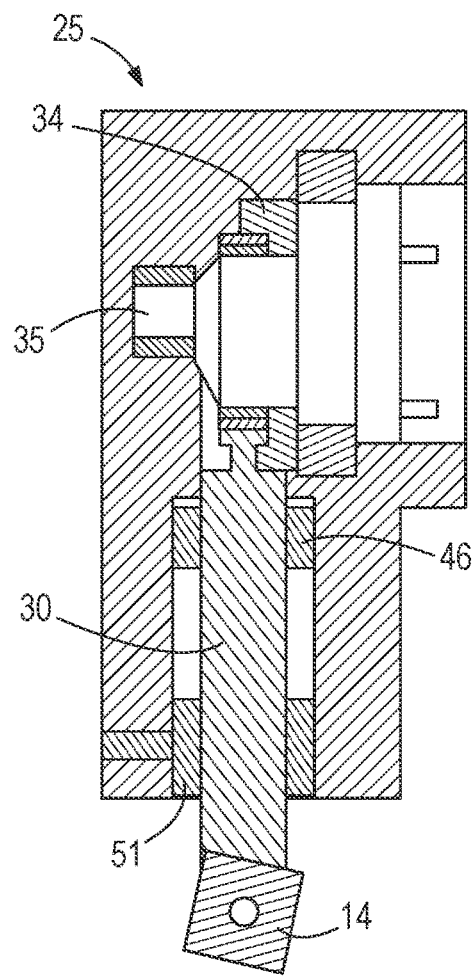
FIG. 6 is a side cross-sectional view of the blade clearance adjustment mechanism of FIG. 5.

With reference to FIGS. 3-4C, an embodiment of a blade clearance adjustment mechanism 24 includes an adjustment member which may be, in some embodiments, a thumb screw 22. The blade clearance mechanism 24 may also include an adjustment bushing or offset bushing 26. The thumb screw 22 is attached to the offset bushing 26, which may be called an adjustment bushing. The offset bushing 26 has an external surface 48 with a cross section that defines an outer shape of a parallelogram with opposite sides 27a, 27b that are parallel to corresponding sides 29a, 29b of a bore or bushing pathway 38 (best shown in FIG. 4A). In other words, the external surface 48 of the offset bushing 26 is inclined at an oblique angle with respect to the reciprocating spindle 30 and the longitudinal axis A1. The offset bushing 26 also includes an internal bore 47 that supports the reciprocating spindle 30. The external surface 48 of the offset bushing 26 is disposed at an angle with respect to the internal bore 47.

With continued reference to FIGS. 3-4C, the thumb screw 22 includes both a knob portion 39 and a shaft portion 40. The shaft portion 40 passes through a passageway in a gearcase 41. Threads may be provided on the shaft portion 40, and the threads may be configured to engage with complementary matching threads 43 that are disposed in the offset bushing 26, with complementary matching threads 44 that are disposed in the gearcase 41, or both. The passageway in the gearcase 41 through which the shaft portion 40 passes may be configured as a slot to accommodate the shaft portion throughout a range of motion. Alternatively, the shaft portion 40 may be configured such that the shaft portion 40 is translationally fixed with respect to the passageway in the gearcase 41 along a longitudinal axis of the shaft portion 40 despite being able to be rotated relative to the gearcase 41. In some constructions, the thumb screw 22 could be a dual thread screw. Also, in some constructions, there may be no threads in the passageway in the gearcase 41 through which the shaft portion 40 of the thumb screw 22 passes.

In operation, and with continued reference to FIGS. 2-4C, the thumb screw 22 may be rotated in a first direction or in a second direction to move the offset bushing 26 either generally upwardly or generally downwardly. The upward and downward movement of the offset bushing 26 within the bushing pathway 38 can be resolved as having components in the vertical direction (coaxial and/or parallel with the reciprocating spindle 30) and in a lateral direction (perpendicular to the reciprocating spindle 30). The motion of the offset bushing 26 results in the translational motion of the reciprocating spindle 30 and therefore of the moving blade 14 either towards or away from the stationary blade 18 depending on the direction of rotation of the thumb screw 22. More specifically, rotation of the thumb screw 22 in a first direction moves the moving blade 14 toward the stationary blade 18 such that the blade clearance C (best shown in FIG. 4C) is decreased. Further, rotation of the thumb screw 22 in the second direction moves the moving blade 14 away from the stationary blade 18 such that the blade clearance C is increased.

In other embodiments, the function of the thumb screw 22 may be performed by another type of adjustment member or actuator, such as a rotatable threaded member, a sliding member, a detent member, an electronic servo motor, an electronic stepper motor, a hydraulic cylinder, a pneumatic device, and the like. The adjustment member may be operable in a first direction to change a position of the offset bushing 26 between a first position associated with a first horizontal blade clearance and a second position associated with a second horizontal blade clearance. The adjustment member may be configured such that operating the adjustment member in a first direction decreases the blade clearance and operating the adjustment member in a second direction increases the blade clearance.

In operation, and with continued reference to FIGS. 4A-4C, the eccentric spindle carrier 34 translates with the motion of the offset bushing 26. For example, in FIG. 4A, the offset bushing 26 is positioned at a right side of the bushing pathway 38 from the viewpoint of FIG. 4A, and the eccentric spindle carrier 34 is also positioned at a right side of a range of motion of the eccentric spindle carrier 34. In FIG. 4B, the offset bushing 26 is positioned at a center of the bushing pathway 38 from the viewpoint of FIG. 4B, and the eccentric spindle carrier 34 is also positioned at a center of the range of motion of the eccentric spindle carrier 34. In FIG. 4C, the offset bushing 26 is positioned at a left side of the bushing pathway 38 from the viewpoint of FIG. 4C, and the eccentric spindle carrier 34 is also positioned at a left side of the range of motion of the eccentric spindle carrier 34.

With reference to FIGS. 5-8C, another embodiment of a blade clearance adjustment mechanism 25 may be provided. Like reference numerals between the embodiments of blade clearance adjustment mechanisms 24, 25 refer to like elements between embodiments. The blade clearance adjustment mechanism 25 includes an adjustment member such as a thumb screw 42 as well as an adjustment bushing or translating bushing 46. The thumb screw 42 is attached to the translating bushing 46, which may be called an adjustment bushing. The translating bushing 46 is provided in a bushing pathway 50 and supports a reciprocating spindle 30. The reciprocating spindle 30 is also supported by a pivotably-supported swing bushing 51. The reciprocating spindle 30 is driven by an eccentric spindle carrier 34, which is itself driven by an output shaft 35. The moving blade 14 is fixed to an end of the reciprocating spindle 30.

Figure 7:
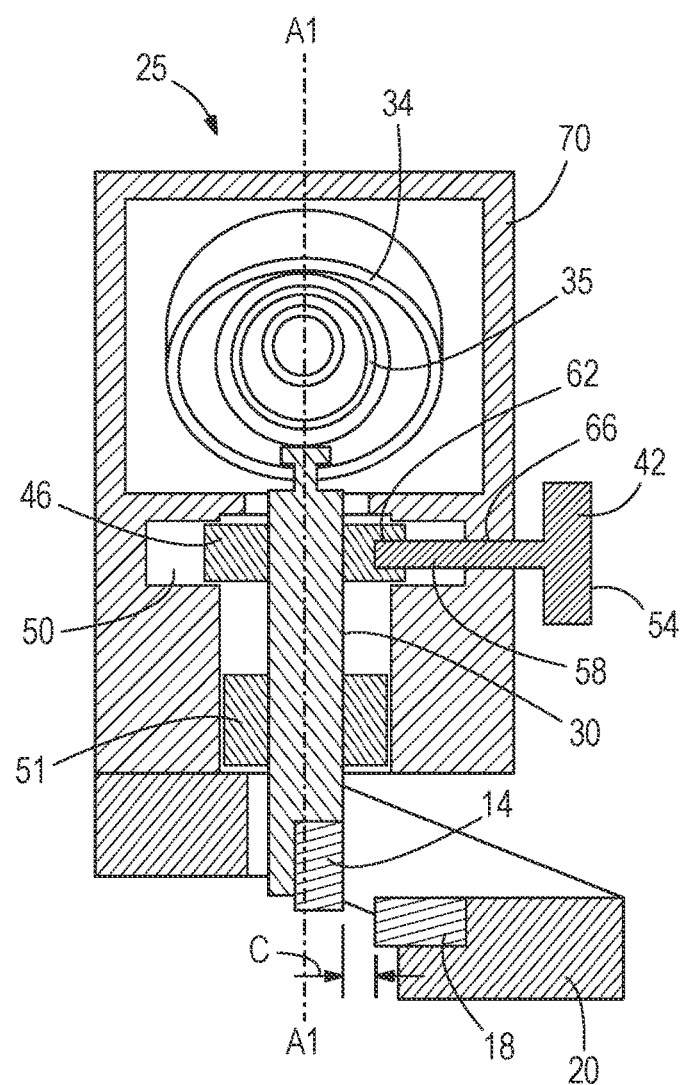
FIG. 7 is a front cross-sectional view of the blade clearance adjustment mechanism of FIG. 5.
Figure 8:
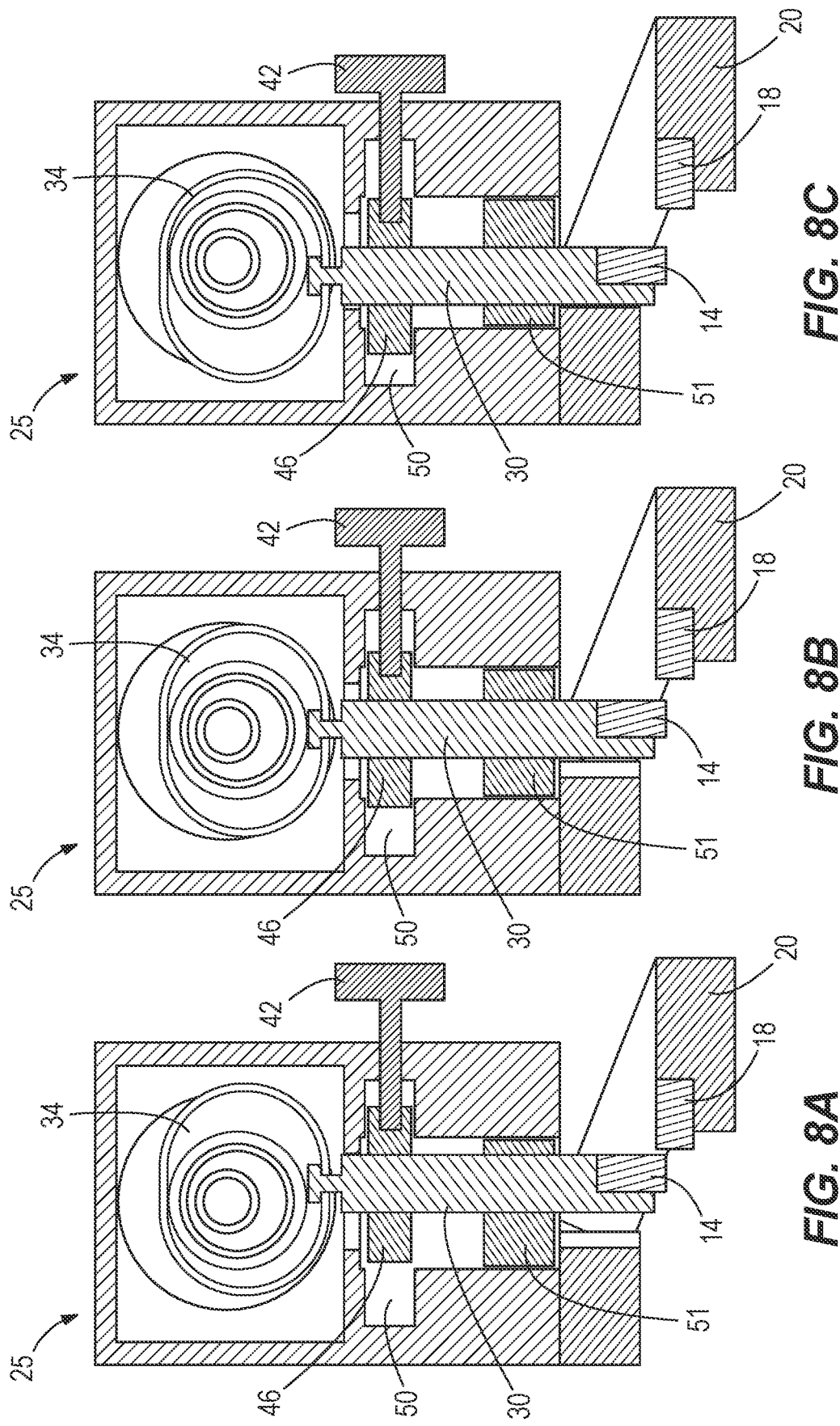
FIGS. 8A-8C are front cross-sectional views of the blade clearance adjustment mechanism of FIG. 5 showing various blade clearances.

With continued reference to FIG. 7, the thumb screw 42 includes a knob portion 54 and a shaft portion 58. The thumb screw 42 may be rotated in a first direction and a second direction. A first end 62 of the shaft portion 58 is attached to the translating bushing 46. For example, the shaft portion 58 may be threaded into the translating bushing 46, the shaft portion 58 may be translationally fixed to the translating bushing 46 but rotatable with respect to the translating bushing 46, or the shaft portion 58 may be coupled to the translating bushing 46 in another manner. Threads may be provided on the shaft portion 58 that are rotationally engageable with complementary threads 66 provided in a gearcase 70 or that are provided in a housing of the scroll shear tool 10.

In operation, and with continued reference to FIGS. 5-8C, rotation of the thumb screw 42 causes the translating bushing 46 to translate in the direction of the bushing pathway 50. Rotation of the thumb screw 42 in the first direction causes threads that are provided on the shaft portion 58 of the thumb screw 42 to thread into the complementary threads 66, and analogously, rotation of the thumb screw 42 in the second direction causes threads that are provided on the shaft portion 58 of the thumb screw 42 to thread out of the complementary threads 66, resulting in motion of the translating bushing 46 relative to the gearcase 70 and perpendicular to a longitudinal axis A1 of the reciprocating spindle 30. In other words, the rotation of the knob portion 54 of the thumb screw 42 translationally moves the translating bushing 46, translationally moves the thumb screw 42, and translationally moves the reciprocating spindle 30. The translational motion of the reciprocating spindle 30 results in movement of the swing bushing 51 between, for example, a first position associated with a relatively small blade clearance (FIG. 8A), a second position associated with a relatively large blade clearance (FIG. 8C), and a third position associated with an intermediate blade clearance (FIG. 8B). The swing bushing 51 is able to move (e.g., rotate or pivot) between the first position, the second position, and other positions therebetween. The translational motion of the reciprocating spindle 30 results in the translational motion of the moving blade 14 either towards or away from the stationary blade 18 depending on the direction of rotation of the thumb screw 42. More specifically, rotation of the thumb screw 42 in the first direction moves the moving blade 14 away from the stationary blade 18 such that the blade clearance C (defined herein) is increased. Further, rotation of the thumb screw 42 in the second direction moves the moving blade 14 toward the stationary blade 18 such that the blade clearance C is decreased.

In other embodiments, the function of the thumb screw 42 may be performed by another type of adjustment member or actuator, such as a rotatable threaded member, a sliding member, a detent member, an electronic servo motor, an electronic stepper motor, a hydraulic cylinder, a pneumatic device, and the like. The adjustment member may be operable in a first direction to change a position of the translating bushing 46 between a first position associated with a first horizontal blade clearance and a second position associated with a second horizontal blade clearance. The adjustment member may be configured such that operating the adjustment member in a first direction decreases the blade clearance and operating the adjustment member in a second direction increases the blade clearance.

Figure 9:
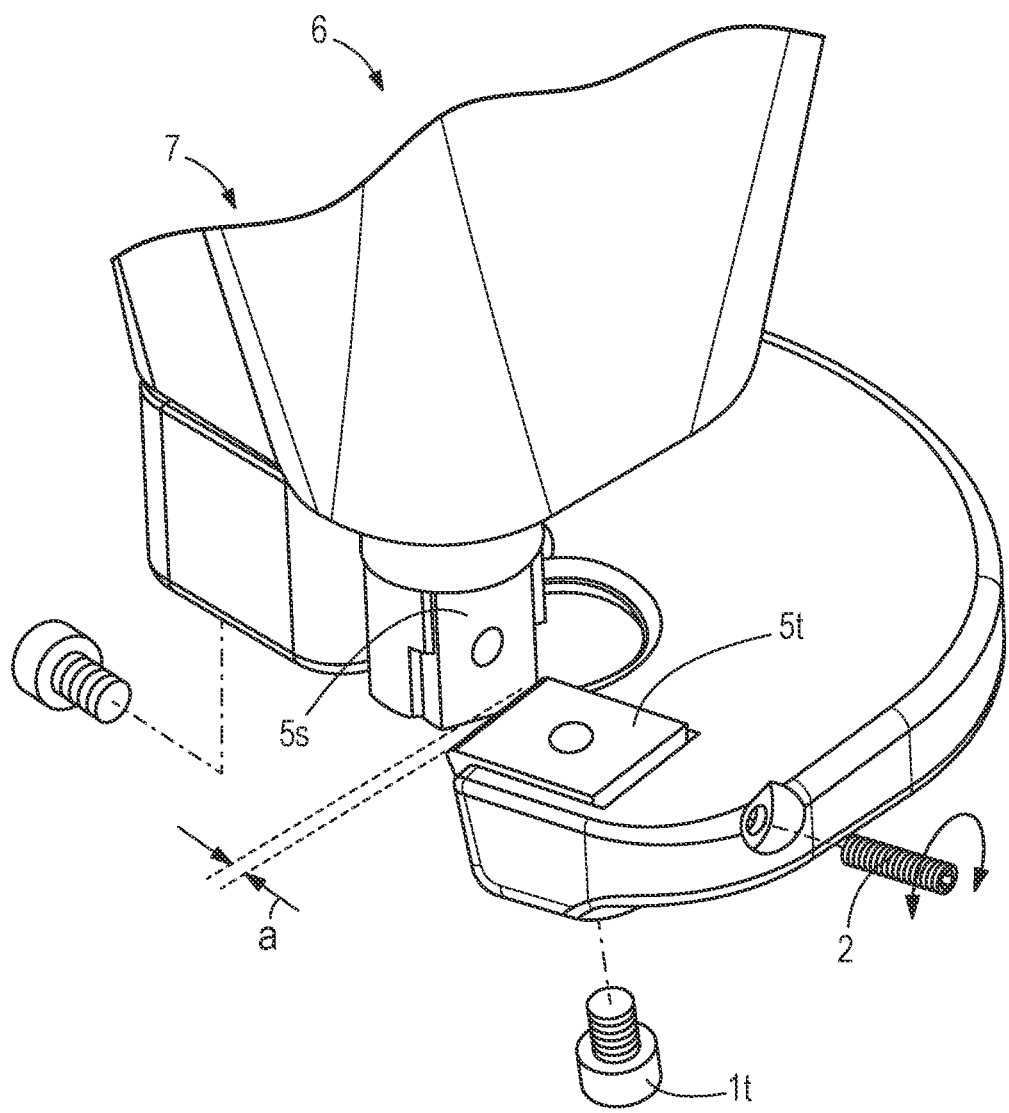
FIG. 9 is a perspective view of another embodiment of a blade clearance adjustment mechanism that may be used with the scroll shear tool of FIG. 1.

In another embodiment of a blade clearance adjustment mechanism 7, and with reference to FIG. 9, a clearance "a" between a moving cutting blade 5s (which may be the same as or similar to the moving blade 14) and a fixed cutting blade 5t (which may be the same as or similar to the fixed blade 18) is adjustable to allow a scroll shear tool 6 to cut workpieces (e.g., metal) of different thicknesses. The clearance "a" between the moving cutting blade 5s and the fixed cutting blade 5t is adjusted by loosening a fixing screw 1t and rotating an adjusting screw 2 until the desired clearance is obtained, at which time the fixing screw 1t is tightened. Adjustment of the screws 1t, 2 may be performed with a tool, such as a hex key.

Figure 10:
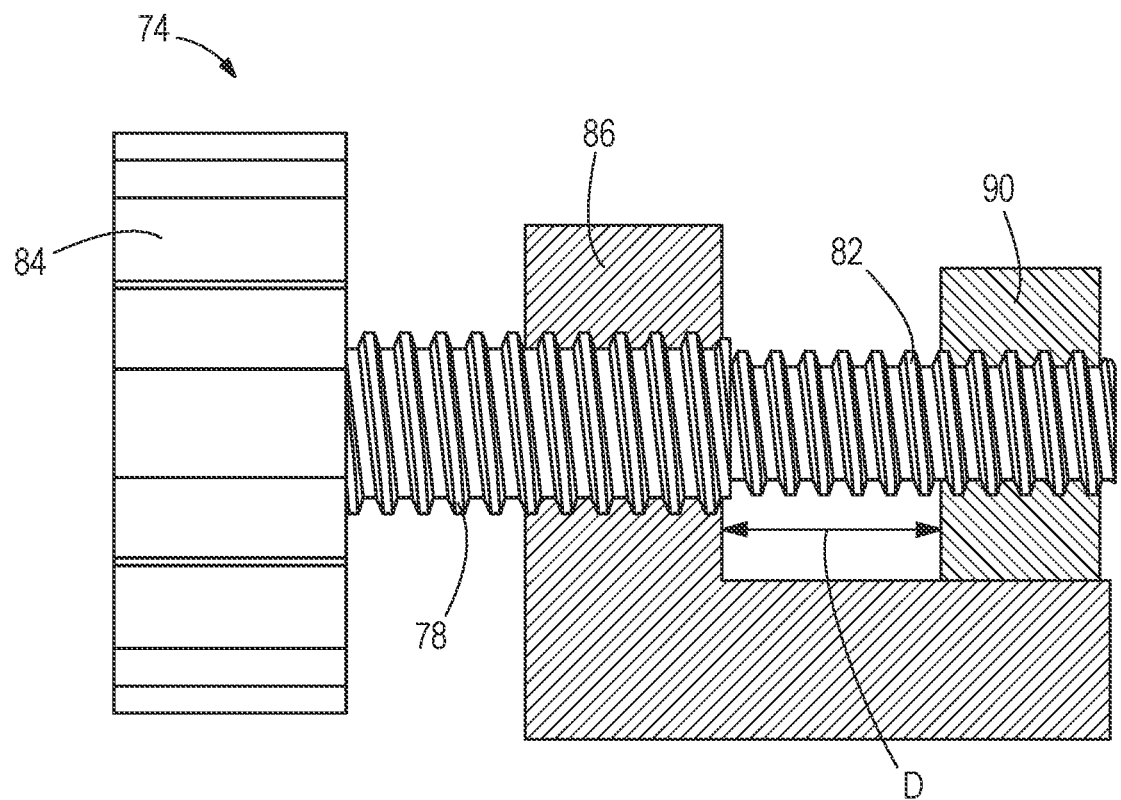
FIG. 10 is a front view of an embodiment of a differential screw that may be used with a blade clearance adjustment mechanism.

In another embodiment of a blade clearance adjustment mechanism, and with reference to FIG. 10, the blade clearance adjustment mechanism may include a differential screw 74 as an adjustment member. The differential screw 74 may be used as one of the thumb screws 22, 42 or it may be used as a blade clearance adjustment mechanism by itself independently of the blade clearance mechanisms 24, 25 or as part of another blade clearance adjustment mechanism. The differential screw 74 includes a first thread section 78 having a first thread pitch, a second thread section 82 having a second thread pitch, and an actuator portion 84. The second thread pitch may be greater than or less than the first thread pitch. The first thread section 78 is configured to mate with complementary threads in a first piece 86, and the second thread section 82 is configured to mate with complementary threads in a second piece 90. In the illustrated embodiment, the second thread section 82 has a smaller diameter than the first thread section 78, but in other embodiments, the first thread section 78 may have a smaller diameter than the second thread section 82. In operation, a user may rotate the actuator portion 84 in a first direction or a second direction. When the actuator portion 84 is rotated in the first direction, the first thread section 78 threads into the complementary threads in the first piece 86, and the second thread section 82 threads into the complementary threads in the second piece 90. Because the first thread pitch is different from the second thread pitch, the rotation of the actuator portion 84 changes a relative distance D between the first piece 86 and the second piece 90. In some constructions, the first piece 86 may be a gearcase of the scroll shear tool 10, and the second piece 90 may be a blade 14, 18 or may be coupled to a blade 14, 18 such that the rotation of the differential screw 74 adjusts a blade clearance between the blades 14, 18.

Figure 11:
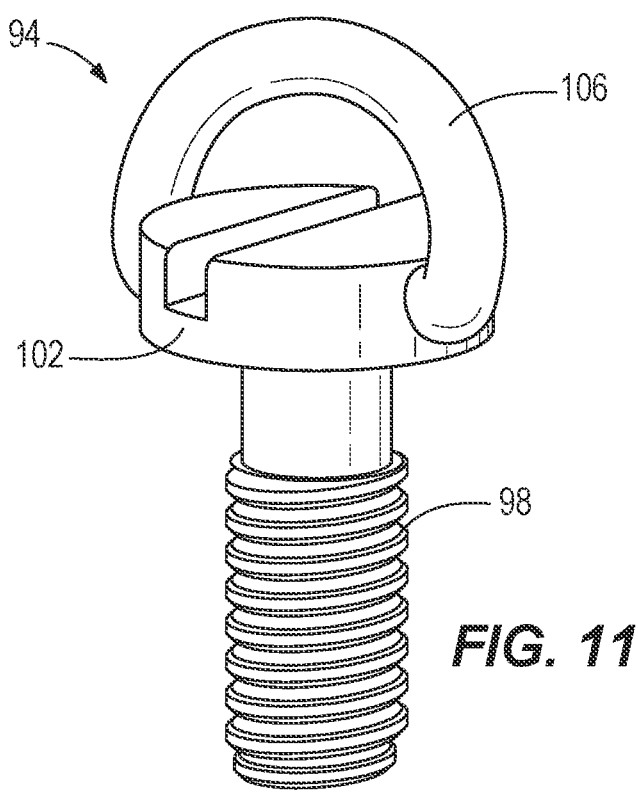
FIG. 11 is a perspective view of an embodiment of a screw that may be used with a blade clearance adjustment mechanism.

In another embodiment of a screw that may be used as one of the screws disclosed herein (such as the thumb screws 22, 42 or the differential screw 74) or with another adjustment member, and with reference to FIG. 11, a screw 94 includes a threaded portion 98, a head 102, and a D-ring portion 106. The head 102 includes a detent mechanism (not shown) for retaining the D-ring portion 106 in two or more positions. The D-ring portion 106 is positionable in an actuating position (shown in FIG. 11). Alternatively, the D-ring portion 106 is positionable in a retracted position in which the D-ring portion 106 is pivoted 90 degrees from the actuating position such that the D-ring portion 106 is flush with the head 102. With the D-ring portion 106 in the actuating position, a user is able to grasp the D-ring portion 106 and rotate the screw 94 by hand. With the D-ring portion 106 in the retracted position, the screw 94 may be rotated by means of a screwdriver or another tool. The head 102 may be configured to be engaged by a variety of tools, including by a flathead screwdriver, a Phillips screwdriver, an Allen wrench, a star bit, or the like.

Figure 12:
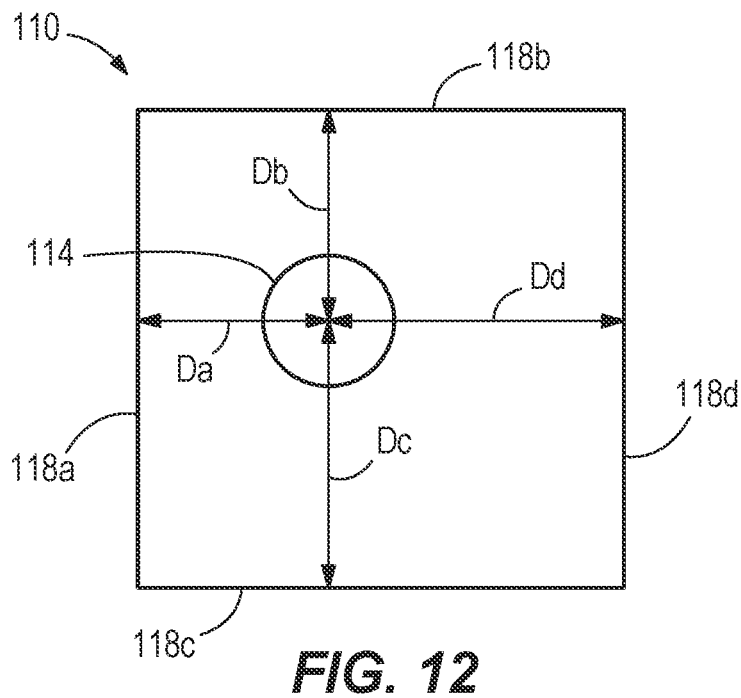
FIG. 12 is a plan view of an embodiment of a non-symmetric blade that may be used with the scroll shear tool of FIG. 1.

With reference to FIG. 12, a non-symmetric blade which may be a non-symmetric fixed blade 110 or a non-symmetric moving blade includes a mounting hole 114 and four sides 118a, 118b, 118c, 118d. In the scroll shear tool 10, the non-symmetric fixed blade 110 may be used in place of the stationary blade 18. The mounting hole 114 includes a hole axis that is at a centroid of the mounting hole 114. The mounting hole 114 is configured to receive a pin such that the non-symmetric fixed blade 110 is rotatable about the pin and such that a longitudinal axis of the pin is coaxial with the hole axis. The axis of the mounting hole 114 is not located at a center of the non-symmetric fixed blade 110 but rather is located off-center. Each of the four sides 118a, 118b, 118c, 118d of the non-symmetric fixed blade 110 defines a cutting edge. Each of the four sides 118a, 118b, 118c, 118d has a characteristic distance Da, Db, Dc, Dd. The characteristic distance Da, Db, Dc, Dd of each side 118a, 118b, 118c, 118d is defined as the shortest distance between the axis of the mounting hole 114 and the cutting edge defined by that respective side 118a, 118b, 118c, 118d. The non-symmetric fixed blade 110 is positionable in four positions such that, in each of the four positions, one of the four sides 118a, 118b, 118c, 118d is facing the moving blade 14 and is therefore used as a cutting side. Rotating the position of the non-symmetric fixed blade 110 such that a different side 118a, 118b, 118c, 118d is used as the cutting side (e.g., changing from side 118a to side 118b) has the effect of changing the blade clearance between the moving blade 14 and the non-symmetric fixed blade 110.

Figure 13:
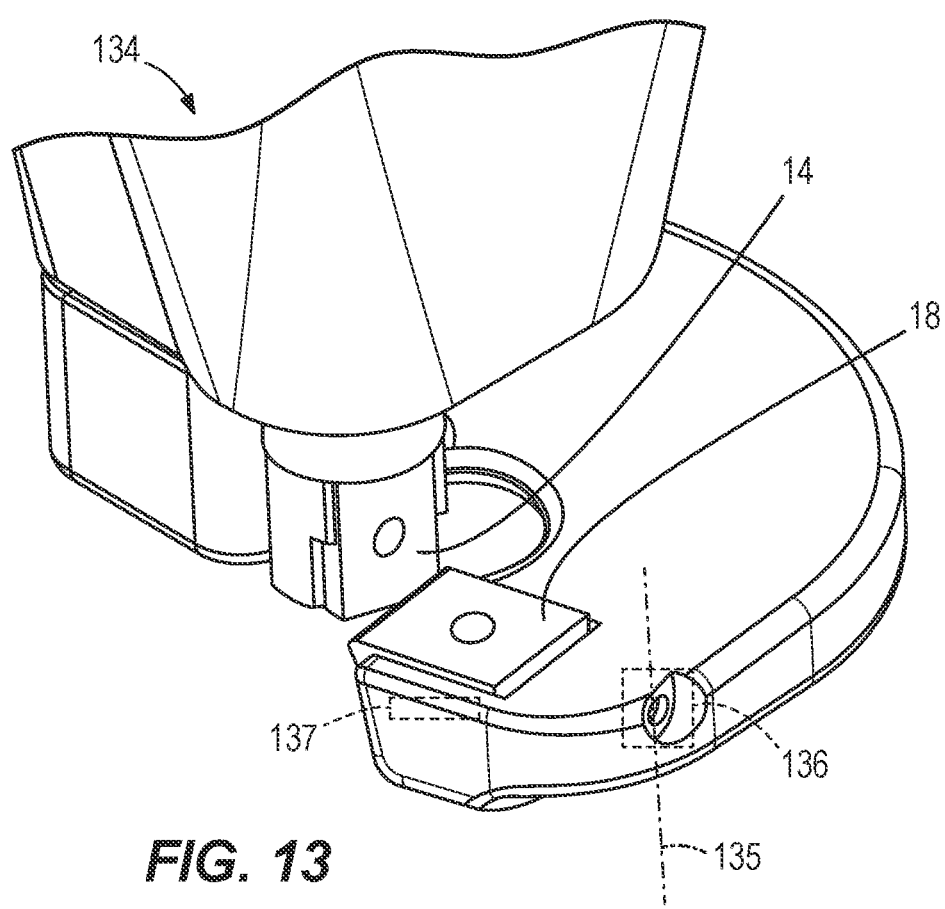
FIG. 13 is a perspective view of an embodiment of a blade clearance adjustment mechanism that may be used with the scroll shear tool of FIG. 1.

With reference to FIG. 13, a blade clearance adjustment mechanism 134 is configured to adjust the blade clearance C (shown in FIG. 4C) by adjusting a position of the stationary blade 18. The stationary blade 18 is biased into a cam 136 by a biasing member such as a spring 137. The cam 136 may be rotated by a user about an axis 135 in a first direction and a second direction. Upon the rotation of the cam 136 about the axis 135 in the first direction, the stationary blade 18 is moved closer to the moving blade 14 against the bias of the spring 137, thereby reducing the blade clearance. Upon rotation of the cam about the axis 135 in the second direction, the stationary blade 18 is moved away from the moving blade 14 by the force of the spring 137, thereby increasing the blade clearance.

Figure 14:
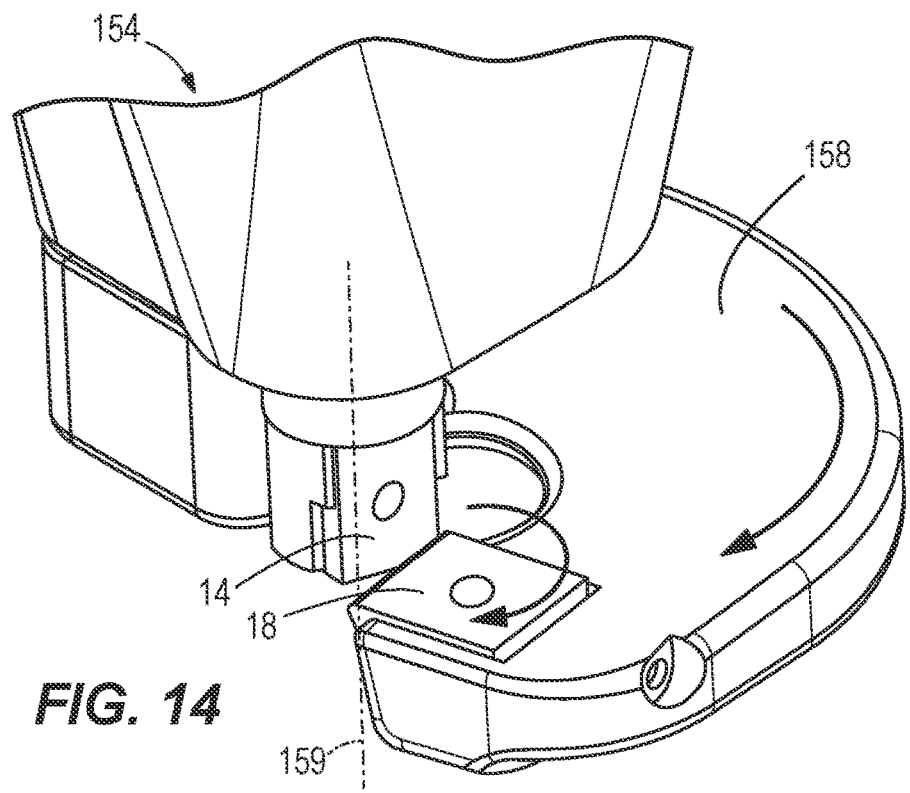
FIG. 14 is a perspective view of an embodiment of a blade clearance adjustment mechanism that may be used with the scroll shear tool of FIG. 1.

With reference to FIG. 14, a blade clearance adjustment mechanism 154 includes a blade support arm 158 that is movable. More specifically, the blade support arm 158 is rotatable about an axis 159 relative to a movable blade 14 to adjust a blade clearance between the movable blade 14 and a fixed blade 18.

Additionally, a blade clearance adjustment mechanism may be provided in which a stationary blade is adjusted perpendicularly to the moving blade using a similar mechanism as that which is used in a conventional utility knife, razor knife, or box cutter. More specifically, a blade may be adjusted by means of a slide that is positionable in a plurality of detent positions to achieve different blade clearances.

Further, a blade clearance adjustment mechanism may be configured to operate similarly to how an adjustable wrench operates. The adjustable wrench includes a rotatable actuator that engages with threads that are coupled to a movable jaw. The movable jaw is disposed at a distance from a stationary jaw. In a construction of a blade clearance adjustment mechanism that is analogous to the adjustable wrench, the movable jaw is analogous to the stationary blade, the stationary jaw is analogous to the movable blade, and the distance between the two jaws is analogous to the blade clearance C (shown in FIG. 4C). A user can adjust the blade clearance C by rotating a rotatable actuator that engages with threads as is done to adjust the clearance between the jaws of the adjustable wrench.

Figure 15:
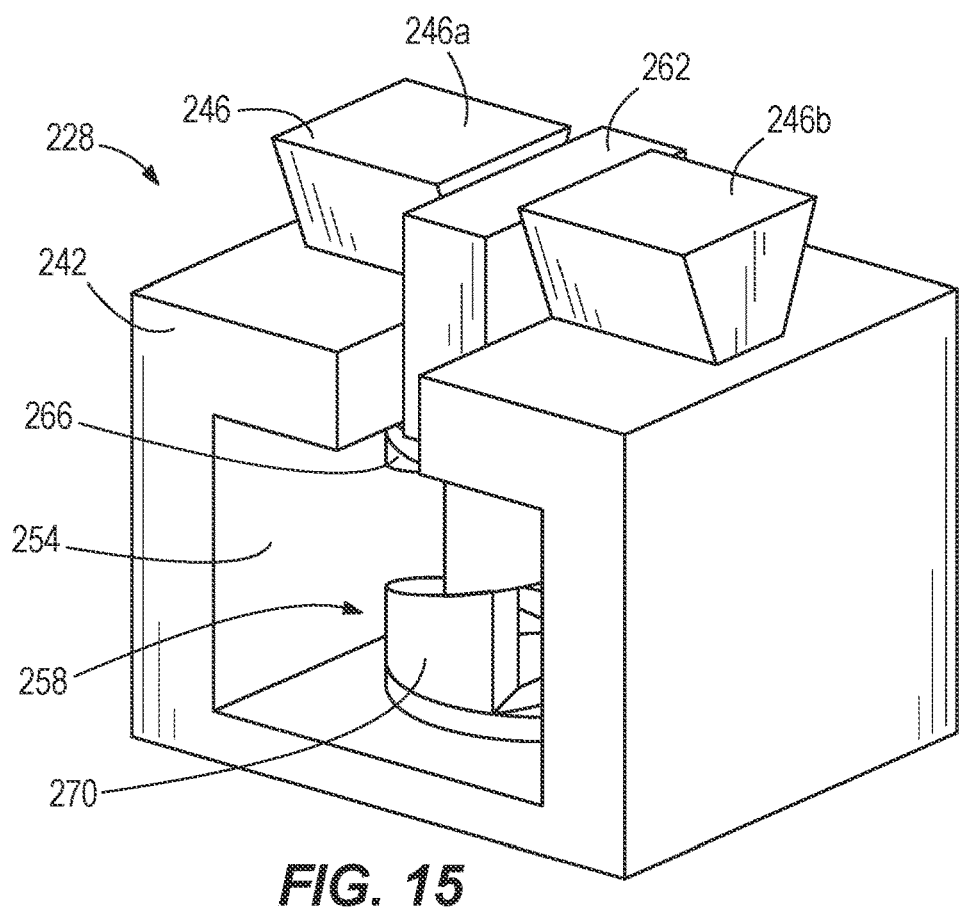
FIG. 15 is a perspective view of an embodiment of a blade removal and rotation mechanism that may be used with the scroll shear tool of FIG. 1.
Figure 16:
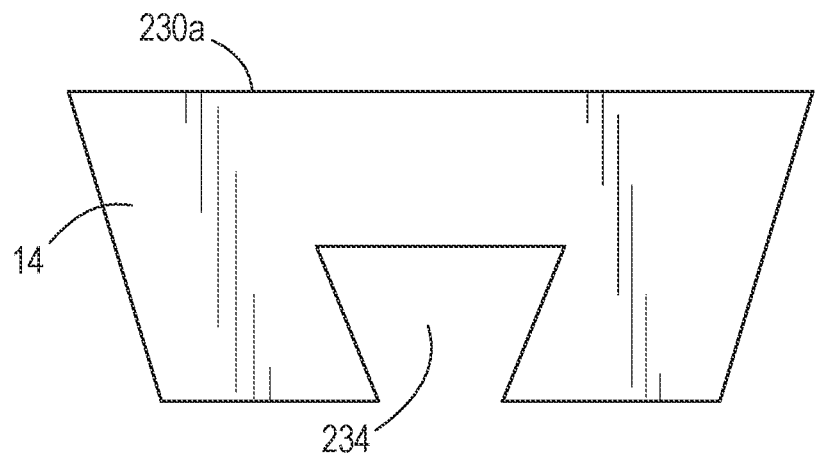
FIG. 16 is a side view of a blade that may be used with the blade removal and rotation mechanism of FIG. 15.
Figure 17:
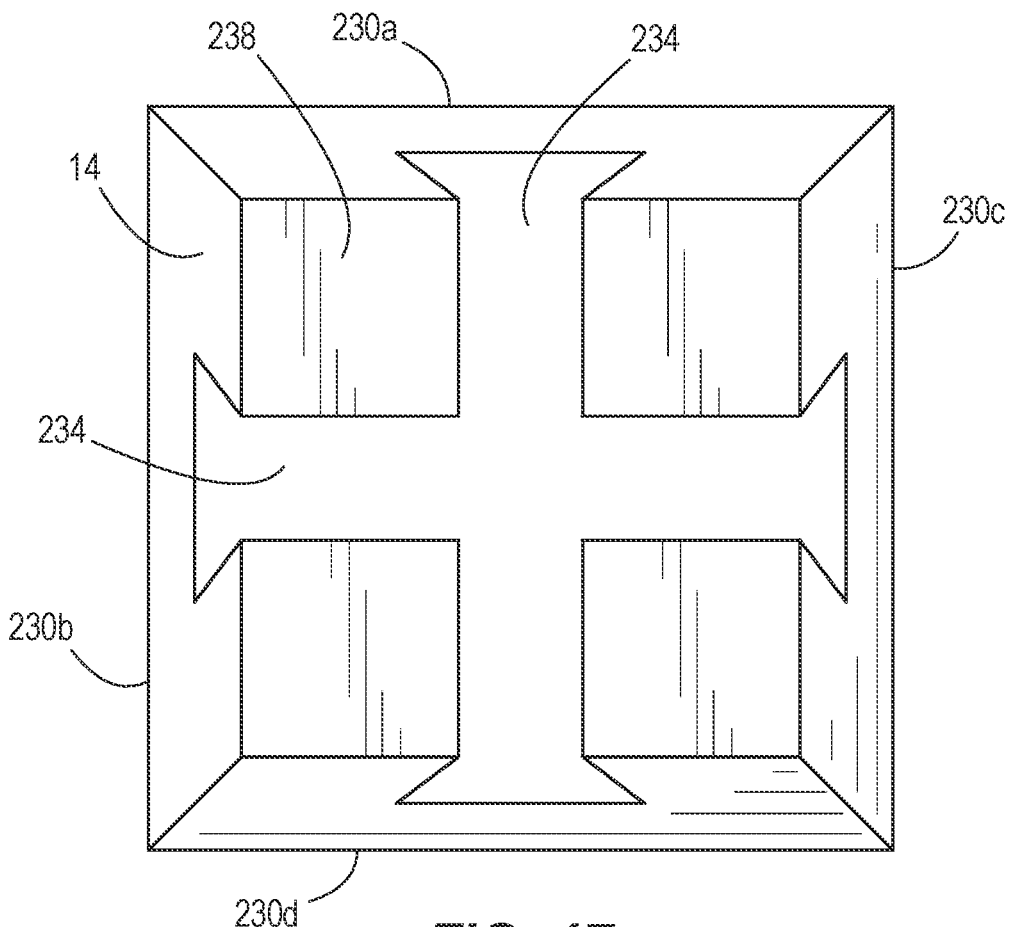
FIG. 17 is a rear view of a blade that may be used with the blade removal and rotation mechanism of FIG. 15.

With reference to FIGS. 15-17 and with further reference to FIG. 1, a scroll shear tool 10 may include a blade removal and rotation mechanism 228 that allows such blade removal or rotation to occur toollessly. According one embodiment, one or both of the blades 14, 18 may be toollessly removed or rotated. In other words, it should be appreciated that the illustrated embodiment of a blade removal and rotation mechanism 228 may be used with either or both the blades 14, 18. Therefore, the illustrated blade will hereinafter be referred to simply as the blade 14 even though it should be understood that it may be either of the moving blade 14 and the stationary blade 18. The blade removal and rotation mechanism 228 includes a support member 242, a cam assembly 258, and a locking member 262 for adjusting a blade 14 and for locking and unlocking the blade 14. The blade 14 includes four cutting edges 230a, 230b, 230c, 230d with each of the cutting edges 230a, 230b, 230c, 230d extending along a side of the blade 14. The blade 14 includes one or more grooves 234 that are cut into a rear side or back side 238 of the blade 14. In the illustrated embodiment, two identical grooves 234 are cut into the back side 238 of the blade 14. The grooves 234 intersect in the form of a plus sign ("+").

Figure 18:
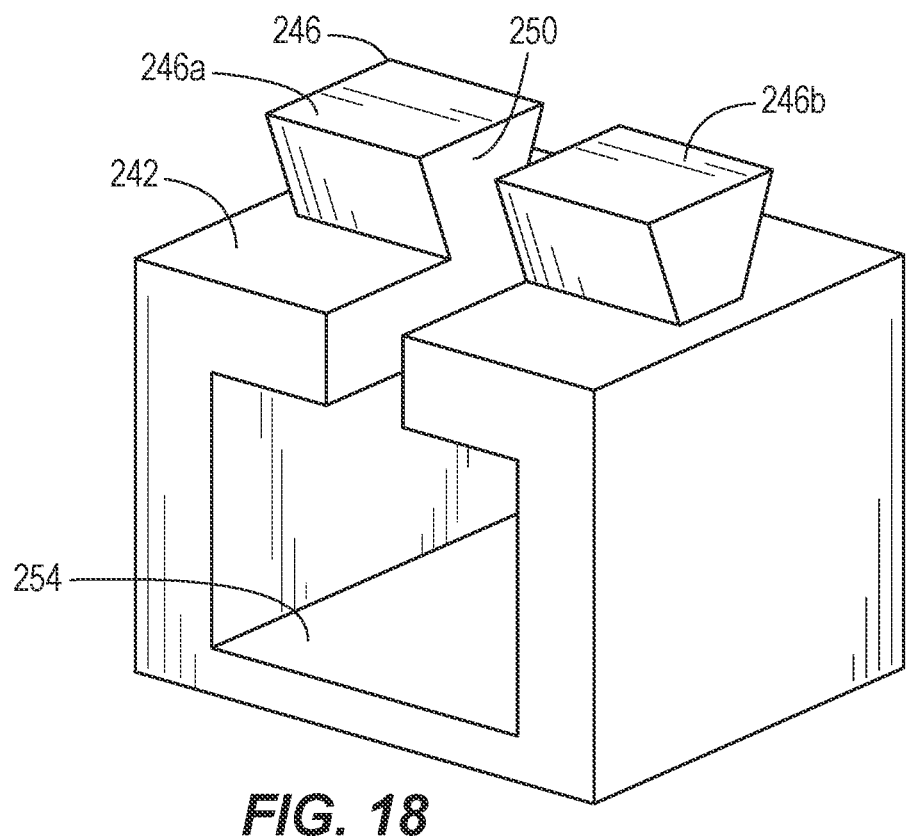
FIG. 18 is a perspective view of a support member of the blade removal and rotation mechanism of FIG. 15.
Figure 19:
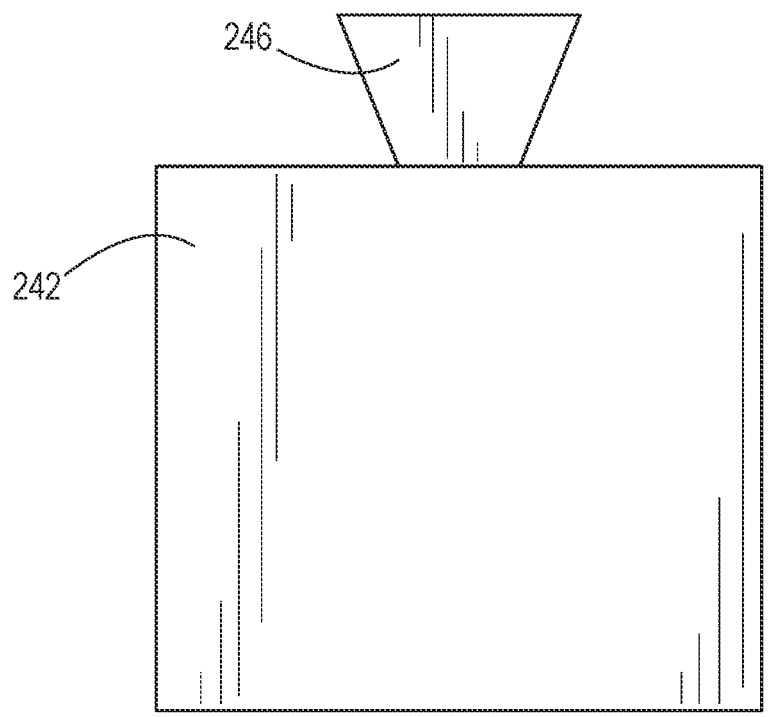
FIG. 19 is a side view of the support member of FIG. 18.

With reference to FIGS. 18 and 19, the blade 14 is configured to be removably mounted to the support member 242. The support member 242 includes a track 246 comprising a first piece or first half 246a and a second piece or second half 246b. The track 246 has a shape that matches a shape of the grooves 234 in the blade 14. The blade 14 removably mounts to the support member 242 by sliding at least one of the grooves 234 over the track 246. As shown in the illustrated embodiment, the shape of the track 246 and the grooves 234 is trapezoidal. However, another shape may be used that inhibits the removal of the blade 14 from the support member 242 in a direction transverse to the track 246.

Figure 20:
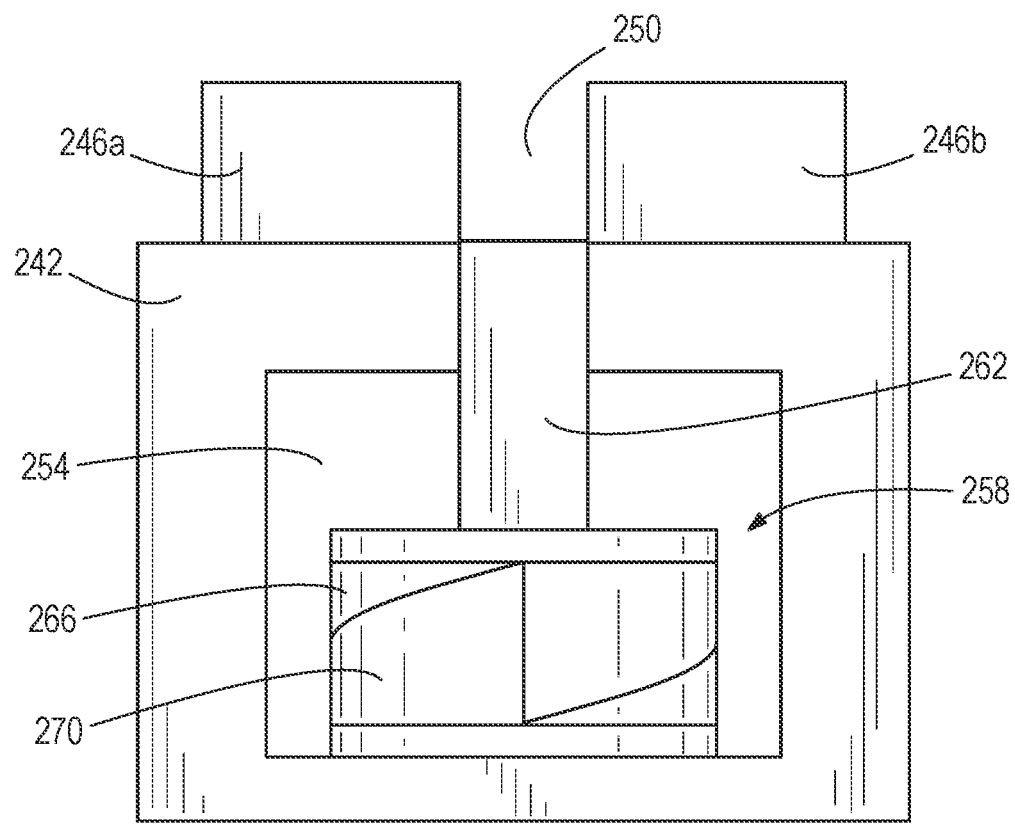
FIG. 20 is a front view of the blade removal and rotation mechanism of FIG. 15.

With reference to FIG. 20, the support member 242 further includes a locking member groove 250 and a cam space 254, and the cam assembly 258 further includes a top cam 266 and a bottom cam 270. The cam assembly 258 is positioned within the cam space 254, and the locking member 262 fits within the locking member groove 250. The locking member 262 is slidable within the locking member groove 250, and a position of the locking member 262 depends on the relative positions of the top cam 266 and the bottom cam 270.

Figure 21:
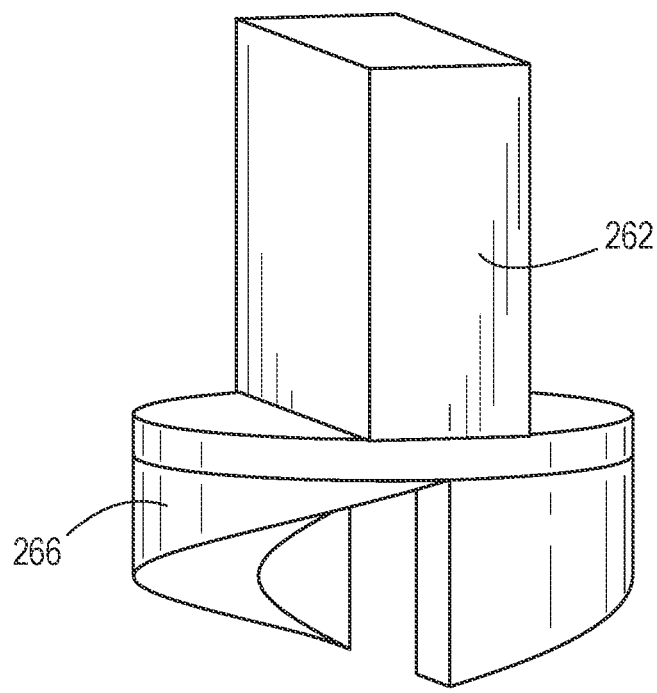
FIG. 21 is a perspective view of a top cam of the blade removal and rotation mechanism of FIG. 15.

With reference to FIG. 21 and with continued reference to FIG. 20, the locking member 262 is formed as a rectangular extrusion on the top cam 266. The bottom cam 270 is rotatable, and the cams 266, 270 are configured such that rotation of the bottom cam 270 is configured to drive the top cam 266 away from the bottom cam 270, thereby forcing the locking member 262 to slide along the locking member groove 250.

Figure 22:
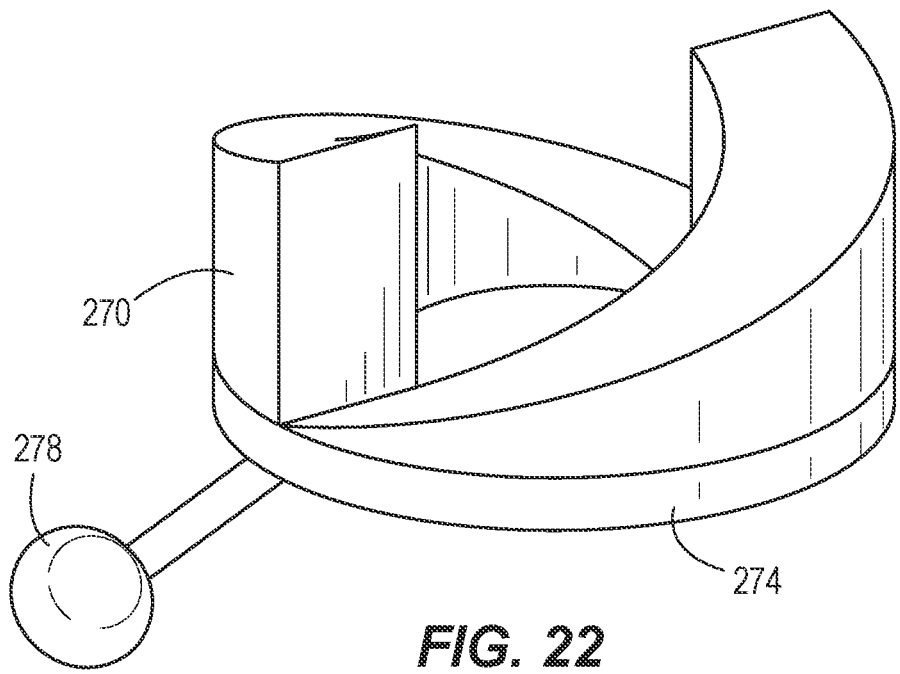
FIG. 22 is a perspective view of a bottom cam of the blade removal and rotation mechanism of FIG. 15 wherein the bottom cam is coupled to a lever.
Figure 23:
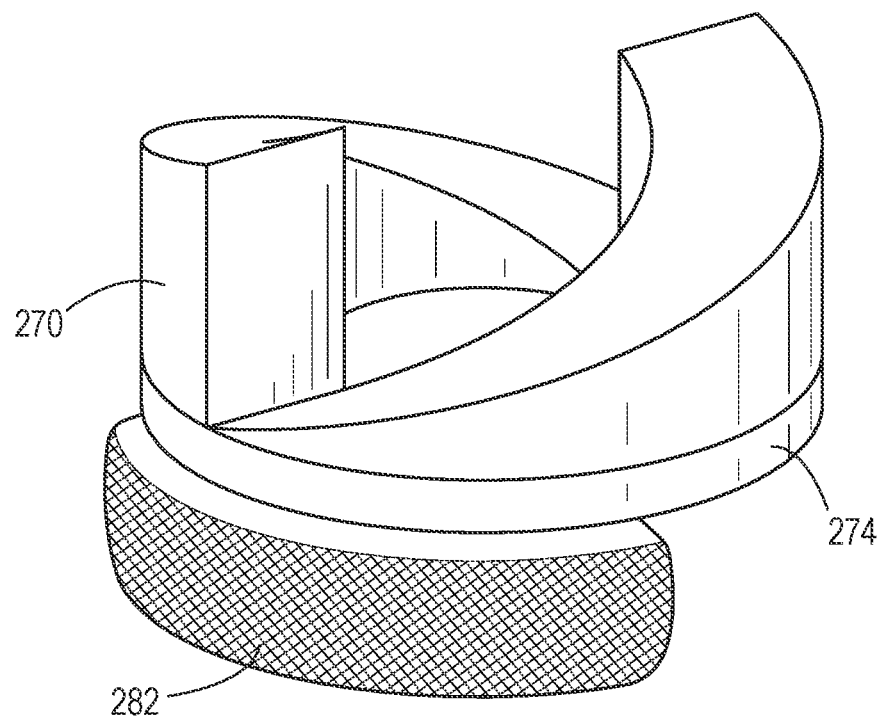
FIG. 23 is a perspective view of a bottom cam of the blade removal and rotation mechanism of FIG. 15 wherein the bottom cam is coupled to a dial.

With reference to FIGS. 22 and 23, the bottom cam 270 may include an actuator that is provided in a region 274. For example, an actuator such as a lever 278 or a dial 282 may be provided on the bottom cam 270 to allow a user to rotate the bottom cam 270 and move the locking member 262 between a locked state and an unlocked state.

Figure 24:
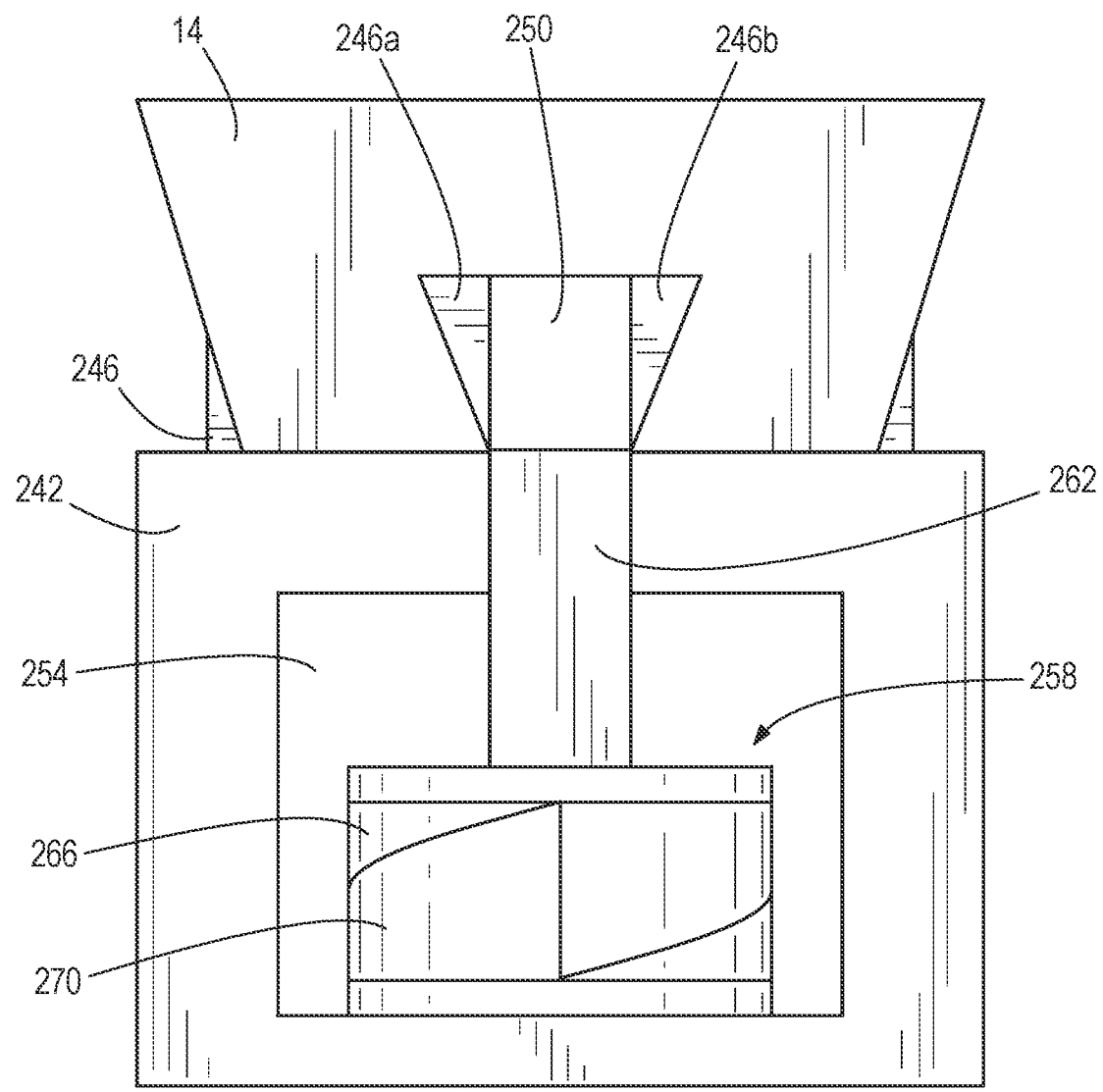
FIG. 24 is a front view of the blade removal and rotation mechanism of FIG. 15 in an unlocked state.
Figure 25:
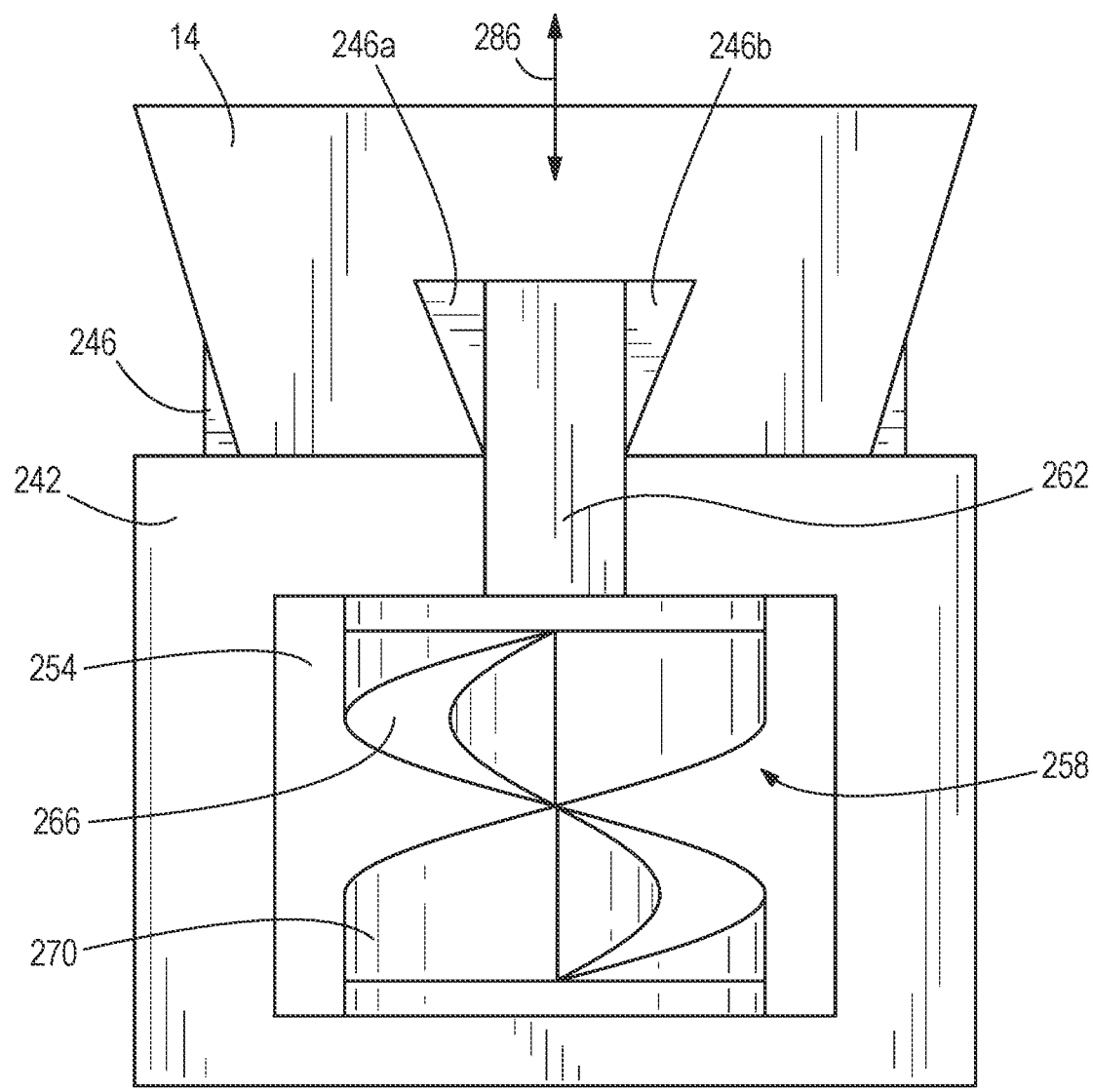
FIG. 25 is a front view of the blade removal and rotation mechanism of FIG. 15 in a locked state.

With reference to FIGS. 24 and 25, the locking member 262 may be positioned in a first unlocked state and in a second locked state. FIG. 24 shows the locking member 262 in the unlocked state, and FIG. 25 shows the locking member 262 in a locked state.

In operation, and with reference to FIG. 25, the locking member 262 is movable in two directions which are indicated by the arrow 286. More specifically, the locking member 262 is movable in a first direction away from the bottom cam 270 and in a second direction toward the bottom cam 270. In other words, the locking member 262 is movable in a first direction toward the blade 14 and into the locking member groove 250 and in a second direction away from the blade 14 out of the locking member groove 250. Moving the locking member 262 in the first direction moves the locking member 262 into the locking state in which the blade 14 is locked in place, and moving the locking member 262 in the second direction moves the locking member 262 into the unlocked state in which the blade 14 is removable. While the locking member 262 is maintained in the locked state, the blade 14 is affixed to the support member 242. When the locking member 262 is positioned in the unlocked state, the blade 14 is toollessly removable from the support member 242 by sliding the blade 14 longitudinally along the track 246 so that the blade 14 may be either rotated 90 degrees to engage a new sharp cutting edge 230a, 230b, 230c, 230d or replaced with a new blade 14. A spring or other resilient and/or biasing member or energy storage means may bias the locking member 262 into either the locked state or the unlocked state.

With reference to FIGS. 26A-26C, a toolless blade rotation or replacement mechanism 310 for a scroll shear includes a blade 318 (which may be the same as or analogous to the blade 18 or the blade 14 of FIG. 1) and a support component or support arm 458 (which may be analogous to the support arm 158 of FIG. 14 and which may be called a forging or which may be analogous to the reciprocatory spindle 30 of FIG. 1, for example). The blade 318 includes a plurality of cutting edges 319a, 319b, 319c, 319d. Only one of the cutting edges 319a, 319b, 319c, 319d is in a cutting position at any particular time. The blade 318 is mounted on a first end of a support pin 322. A second end of the support pin 322 is affixed to an actuator 326. A biasing member or spring 330 is positioned around the support pin 322 and is configured to bias the actuator 326 away from the support arm 458. The support pin 322 is positioned within a bore 334 in the support arm 458. The actuator 326 is configured to receive an applied force such as a pushing force from a user.

In operation, and with reference to FIGS. 26A-26C, the toolless blade rotation or replacement mechanism 310 is biased into a first operating state as shown in FIG. 26A but is also positionable in a second adjustment state as shown in FIG. 26B. The first operating state may be called an engaged state, an engaged position, a rest state, or a rest position. The second adjustment state may be called a disengaged state or disengaged position. In the first operating state, the blade 318 is adjacent support arm surfaces 362, 366. One or both of the support arm surfaces 362, 366 may each be parallel to one or more of the cutting edges 319a, 319b, 319c, 319d. In the illustrated embodiment, the support arm surface 362 is parallel to the cutting edge 319c, and the support arm surface 366 is parallel to the cutting edge 319d. The spring 330 biases the blade 318 into the first operating state. An application of a user's pushing force to the actuator 326 is able to overcome the biasing force of the spring 330 in order to move the blade 318 from the first operating state to the second adjustment state. The support arm surfaces 362, 366 may be operable to prevent the rotation of the blade 318 when the blade 318 is positioned in the first operating state. In some embodiments, blades such as, for example, the blades 14, 18, 318 may include various numbers of cutting edges such as three, four, five, six, seven, eight, etc. Accordingly, the blades 14, 18, 318 may be shaped as various suitable shapes including polygons such as triangles, rectangles, pentagons, hexagons, heptagons, octagons, etc. of various shapes and sizes. In some embodiments, cutting edges may be curved.

In operation, and with continued reference to FIGS. 26A-26C, when the blade 318 is positioned in the second adjustment state, the blade 318 may be rotated through a particular angle, which in the illustrated embodiment is either 90, 180, or 270 degrees, to change which of the cutting edges 319a, 319b, 319c, 319d is in the cutting position. Further, while the blade 318 is in the second adjustment state, the blade 318 is removable from the support pin 322 such that a new blade 318 may be installed.

Features of the embodiments disclosed herein may be interchangeable between constructions. In other words, a construction of a scroll shear tool 10 may include any permutation of the features disclosed herein.

Although the invention has been described in detail with reference to certain preferred embodiments, variations and modifications exist within the scope and spirit of one or more independent aspects of the invention as described.

Various features of the invention are set forth in the following claims.

What is claimed is:

1. A scroll shear tool comprising:
 a tool body housing a motor, wherein the motor is configured to transmit rotational power through a transmission to a reciprocatory spindle, the transmission including a drive member, wherein the reciprocatory spindle includes a first end that is supported by the drive member and a second end distal from the drive member;
 a blade support arm at least partially surrounding the reciprocatory spindle;
 a fixed blade coupled to the blade support arm;
 a moving blade coupled to the second end of the reciprocatory spindle; and
 a blade clearance adjustment mechanism configured to adjust a horizontal blade clearance between the fixed blade and the moving blade, wherein the blade clearance adjustment mechanism includes
  an adjustment bushing supported within a bushing pathway, wherein the adjustment bushing includes an internal bore that supports the reciprocatory spindle and wherein a relative position of the adjustment bushing within the bushing pathway affects a relative position of the moving blade with respect to the fixed blade, and
  an adjustment member coupled to the adjustment bushing, wherein the adjustment member is configured to change the relative position of the adjustment bushing between a first position associated with a first blade clearance and a second position associated with a second blade clearance.

2. The scroll shear tool of claim 1, wherein the drive member is an eccentric spindle carrier.

3. The scroll shear tool of claim 1, wherein the adjustment member includes a thumb screw that is configured to be accessible by a user.

4. The scroll shear tool of claim 3, wherein the thumb screw is configured to rotate in a first direction to decrease the horizontal blade clearance and in a second direction to increase the horizontal blade clearance.

5. The scroll shear tool of claim 1, wherein the adjustment member is operable in a first direction to decrease the horizontal blade clearance and in a second direction to increase the horizontal blade clearance.

6. The scroll shear tool of claim 1, wherein the adjustment bushing has an external surface with a cross section that defines an outer shape of a parallelogram with opposite sides that are each parallel to a corresponding side of the bushing pathway.

7. The scroll shear tool of claim 1, wherein the adjustment bushing has an external surface that is inclined at an oblique angle with respect to a longitudinal axis of the reciprocatory spindle.

8. The scroll shear tool of claim 1, wherein the adjustment member includes a dual thread screw.

9. The scroll shear tool of claim 1, wherein the adjustment bushing is configured to move in a lateral direction as the adjustment bushing is moved longitudinally along an axis of the reciprocatory spindle.

10. The scroll shear tool of claim 1, wherein the adjustment bushing is configured to move transversely relative to a longitudinal axis of the reciprocatory spindle.

11. The scroll shear tool of claim 10, further comprising a swing bushing that supports the reciprocatory spindle, wherein the swing bushing is configured to pivot in response to a movement of the adjustment bushing in a direction transverse to the longitudinal axis.

\* \* \* \* \*